US008689291B2

(12) United States Patent
Cui (10) Patent No.: US 8,689,291 B2
(45) Date of Patent: Apr. 1, 2014

(54) WIRELESS ACCESS DEVICE AND METHOD (75) Inventor: Jian Cui, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/583,018

(22) PCT Filed: Oct. 29, 2010

(86) PCT No.: PCT/CN2010/078253
§ 371 (c)(1),
(2), (4) Date: Sep. 6, 2012

(87) PCT Pub. No.: WO2012/009898
PCT Pub. Date: Jan. 26, 2012

(65) Prior Publication Data
US 2012/0331523 A1 Dec. 27, 2012

(30) Foreign Application Priority Data

Jul. 21, 2010 (CN) .......................... 2010 1 0234911

(51) Int. Cl.
*G06F 21/00* (2013.01)
(52) U.S. Cl.
USPC ................ 726/3; 726/2; 726/4; 726/5; 726/6; 713/168; 713/169; 713/170; 713/171; 713/172; 713/173; 713/174
(58) Field of Classification Search
USPC .................................. 713/168–174; 726/2–6
See application file for complete search history.

(56) References Cited

U.S. PATENT DOCUMENTS

2001/0034773 A1* 10/2001 Kujirai ........................... 709/217
2006/0206592 A1* 9/2006 Fujii et al. ..................... 709/220

(Continued)

FOREIGN PATENT DOCUMENTS

CN 1601434 A 3/2005
CN 2927179 Y 7/2007

(Continued)

OTHER PUBLICATIONS

International Search Report in international application No. PCT/CN2010/078253, mailed on May 5, 2011.

(Continued)

*Primary Examiner* — David Pearson
*Assistant Examiner* — Josnel Jeudy
(74) *Attorney, Agent, or Firm* — Oppedahl Patent Law Firm LLC (57) ABSTRACT

The disclosure discloses a wireless access device (2), which includes: a wireless module (204) which establishes a wireless connection with a network, a solid state memory (203) partitioned into different storage volumes, a driver management module (202) and an enumeration management module (201). In the solid state memory, the fourth storage volume stores a bootstrap, the first storage volume stores an operating system and system management software, and the third storage volume stores encryption driver management software, device drive software and device management software. The driver management module (202) stores storage volume information. The enumeration management module (201) enumerates the fourth storage volume storing the bootstrap as a driver after the wireless access device is powered on, and is switched to a host mode or a peripheral device mode according to the received command indicating to switch to the host module transmitted by the bootstrap which is run on computer device and the storage volume information in the driver management module. The disclosure also discloses a wireless access method. The purpose of the disclosure is to provide the wireless access device which is easy to be maintained and convenient for carry, and the wireless access method, so as to improve user experience and security.

24 Claims, 2 Drawing Sheets

(56) References Cited

U.S. PATENT DOCUMENTS

| | | | |
|---|---|---|---|
| 2008/0244254 A1 | 10/2008 | Cromer et al. | |
| 2009/0005005 A1* | 1/2009 | Forstall et al. | 455/411 |
| 2009/0198989 A1 | 8/2009 | Rofougaran et al. | |
| 2009/0298478 A1* | 12/2009 | Tyhurst et al. | 455/414.1 |
| 2011/0002344 A1* | 1/2011 | Palin et al. | 370/428 |

FOREIGN PATENT DOCUMENTS

| | | |
|---|---|---|
| CN | 101075178 A | 11/2007 |
| CN | 101431828 A | 5/2009 |
| CN | 101465777 A | 6/2009 |
| CN | 101620538 A | 1/2010 |
| GB | 2448012 A | 10/2008 |
| WO | 0165365 A1 | 9/2001 |

OTHER PUBLICATIONS

English Translation of the Written Opinion of the International Search Authority in international application No. PCT/CN2010/078253, mailed on May 5, 2011.

Supplementary European Search Report in European application No. 10854928.8, mailed on Dec. 2, 2013. (7 pages—see entire document).

* cited by examiner

WIRELESS ACCESS DEVICE AND METHOD

TECHNICAL FIELD

The disclosure relates to the field of wireless data communications and computer technology, in particular to a wireless access device and a wireless access method.

BACKGROUND

Personal computing is a computing mode which provides computing service for a single user on a specific software and hardware device. The user environment and computing performance of a personal computer are determined by software and hardware systems of a single computer device. The personal computer, the mobile phone and the like are common computer devices. The computer device has the following disadvantages: firstly, the operating system of the computer is required to be maintained by a user, and the work, such as upgrading the operating system and the software, is required to be operated by the user himself; and secondly, upgrading the hardware of the computer device sometimes causes reinstalling of the operating system, which brings a great inconvenience to the user.

At present, the personal computing is changing towards the cloud computing. The cloud computing, which is proposed by Google, is a dynamic and easily extendable application mode and generally provides virtual resource computing through the Internet. At the beginning, the cloud computing is introduced into devices, such as a computer, a mobile phone and the like, in the form of a web application and the user can experience the cloud computing, such as online document editing, cloud storing, cloud input method editor and the like on line. In a pure cloud computing mode, a terminal used by the user is only a display and input device and all the applications are implemented in the cloud.

There are mainly two ways of using the cloud computing: one is to log in the cloud through a browser of the operating system in the computer device; and the other is to log in the cloud through a cloud terminal. The cloud terminal, which is like an Automatic Teller Machine (ATM) of a bank, only provides a basic input and output interface with a cloud server and a network for accessing to the cloud server. When the cloud is logged in through the browser of the operating system in the computer device, the cloud computing is limited by the network access; if the user only has the computer device while the network connection does not exist, then the user cannot log in the cloud; meanwhile, when the user uses different computer devices to log in the cloud, generally the authentication information including a user name and a password needs to be input; if the user logs in the cloud on a public computer device, the security of the authentication information is largely depended on the security of the public computer device and the security of the network to which the public computer device connects, so that potential security hazard exists. Furthermore, the user needs to maintain the computer device to guarantee its usability, and if the local operating system is in fault, the cloud computing cannot be used.

The personal computing and the cloud computing both have advantages and disadvantages, so the two computing ways will be coexisted for a long time in the future. The user can experience the convenience of the cloud computing and the advantages of the personal computing are also reserved, which is regarded as a technical development direction. However, there is not a definite solution currently.

SUMMARY

In view of this, the main purpose of the disclosure is to provide a wireless access device and a wireless access method, which may improve the user experience and be easy to be maintained, high in security and convenient for carry.

In order to realize the purpose, the technical solution of the disclosure is realized below.

The disclosure provides a wireless access device, which includes: a wireless module which establishes a wireless connection with a network and a solid state storage memory which is partitioned into different storage volumes, wherein in the solid state storage, a fourth storage volume stores a bootstrap program, a first storage volume stores an operating system and a system management software, and a third storage volume stores an encryption driver management software, a device drive software and a device management software, wherein the wireless access device further includes an enumeration management module and a driver management module;

the driver management module is configured to store information of the storage volumes;

the enumeration management module is configured to: enumerate the fourth storage volume storing the bootstrap as a driver after the wireless access device is powered on; switch to a host mode according to the information of the storage volumes in the driver management module when it is determined that a command which indicates to switch to the host mode transmitted by the bootstrap running on a computer device is received, and enumerate the first storage volume, the third storage volume and the wireless module as drivers; switch to a peripheral device mode according to the information of the storage volumes in the driver management module when it is determined that the command which indicates to switch to the host mode is not received, and enumerate the third storage volume and the wireless module as drivers.

In above-mentioned solution, the wireless access device further includes: a timer configured to initiate when the wireless access device is powered on, wherein the enumeration management module is configured to: read a timing time of the timer, and transmits the command which indicates to switch to the host mode to the driver management module when the command which indicates to switch to the host mode is not received within the timing time of the timer; receive host mode storage volume information transmitted by the driver management module, enumerate the first storage volume and the third storage volume as drivers, and meanwhile enumerate the wireless module as a driver, and cancel the enumeration for the fourth storage volume; and meanwhile the bootstrap resets the computer device; and the driver management module is configured to receive the command which indicates to switch to the host mode from the enumeration management module, and transmit the host mode storage volume information to the enumeration management module.

In above-mentioned solution, the enumeration management module is configured to: transmit a command which indicates to switch to the peripheral device module to the driver management module when it is determined that the command which indicates to switch to the host mode is not received within the timing time, receive information of the third storage volume, and enumerates the third storage volume as a driver according to the information of the third storage volume; receives a command which indicates to enumerate continuously from the encryption driver management software or the device management software running on the computer device, and enumerates the wireless module as a driver; and the driver management module is configured to receive the command which indicates to switch to the peripheral device mode transmitted from the enumeration management module, and returns the information of the third storage volume to the enumeration management module.

In above-mentioned solution, the solid state memory further includes a second storage volume for storing user data; the enumeration management module is configured to enumerate the second storage volume as a driver when the enumeration management mode is in the host mode and information of the second storage volume indicates to participate in the enumeration and when the first storage volume, the third storage volume and the wireless module are enumerated as drivers; and the enumeration management module transmits the received command which indicates to enumerate continuously to the driver management module after enumerating the third storage volume as a driver in the peripheral device mode, enumerates the second storage volume as a driver according to the returned information of the second storage volume which indicates to participate in the enumeration, and meanwhile enumerates the wireless module as a driver; and the driver management module is configured to receive the command which indicates to enumerate continuously and transmits the information of the second storage volume to the enumeration management module.

In above-mentioned solution, the wireless access device further includes: a device security module configured to receive user inputted authentication information transmitted by the encryption driver management software or the device management software, and transmit information of successful authentication to the encryption management software or the device management software after the successful authentication, and the encryption driver management software or the device management software transmits the command which indicates to enumerate continuously to the enumeration management module.

In above-mentioned solution, the device security module is further configured to receive the authentication information transmitted by the operating system, confirming the successful authentication and allowing the user to log in the operating system, log in the cloud and access to the network through the operating system when logging in the operating system, logging in the cloud and accessing to the network through the operating system in the host mode; and the device security module is further configured to log in the cloud and access to the network through the operating system and the wireless module, receive the authentication information transmitted by the wireless module, confirm the successful authentication and allow the user to log in the cloud and access to the network in the peripheral device mode.

In above-mentioned solution, the wireless access device further includes: a device interface configured to provide a channel to connect with the computer device, wherein the channel comprises a plurality of wires, and a wire of the plurality wires is configured to provide power from the computer device to the wireless access device, and wherein a level of the wire of the plurality of wires of the channel is high when the device interface is powered on; and the enumeration management module is connected with the device interface The disclosure further provides a wireless access method, which includes:

a wireless access device is powered on, a fourth storage volume storing a bootstrap is enumerated as a driver, wireless access device is switched to a host mode when it is determined that a command which indicates to switch to a host mode transmitted by the bootstrap is received, and a first storage volume, a third storage volume and a wireless module are enumerated as drivers; an operating system in the wireless access device is uploaded, and the wireless access device accesses to a network through the wireless module;

The wireless access device is switched to a peripheral device mode when it is determined that the command which indicates to switch to the host mode transmitted by the bootstrap is not received, the third storage volume and the wireless module are enumerated as drivers, and the wireless access device accesses to the network through the wireless module.

In above-mentioned solution, the switching to the host mode includes: a timer is initiated after the wireless access device is powered on, the wireless access device is switched to the host mode when the command which indicates to switch to the host mode transmitted by the bootstrap running on a computer device is received within a timing time; the first storage volume, the third storage volume and the wireless module are enumerated as drivers according to self-stored information of the first storage volume and the third storage volume, and meanwhile the enumeration for the storage volume where the bootstrap exists is cancelled.

In above-mentioned solution, the switching to the peripheral device mode includes: a timer is initiated after the wireless access device is powered on, The wireless access device is switched to the peripheral device mode when the command which indicates to switch to the host mode is not received within a timing time, and the third storage volume is enumerated as a driver according to the self-stored information of the third storage volume; a computer device transmits a command which indicates to enumerate continuously to the wireless access device by running an encryption driver management software or a device management software; or the computer device transmits the command which indicates to enumerate continuously to the wireless access device by running the encryption driver management software or the device management software and inputting authentication information which is successfully authenticated by a device security module, and the wireless access device enumerates the wireless module as a driver.

In above-mentioned solution, the wireless access device includes a second storage volume for storing user data, the method further includes: the wireless access device is switched to the host mode, the second storage volume is enumerated as a driver when the wireless access device enumerates the first storage volume, the third storage volume and the wireless module as drivers and when information of the second storage volume indicates to participate in the enumeration; and the wireless access device is switched to the peripheral device mode, the third storage volume is enumerated as a driver, and the computer device transmits a command which indicates to enumerate continuously to the wireless access device; and the wireless access device enumerates the second storage volume as a driver according to self-stored information of the second storage volume which indicates to participate in the enumeration, and meanwhile the wireless module is enumerated as a driver.

In above-mentioned solution, powering on the wireless access device includes: the wireless access device reads an interface level of a device interface connected to the computer device, and the wireless access device is powered on when the interface level is high.

By adopting the wireless access device and the wireless access method disclosed by the disclosure, advantages of the computer device and the cloud computing are combined; the wireless module is arranged internally, which can provide wireless access when the computer device does not have wired network, so as to facilitate network connection, for example it is more convenient to use the cloud service; the operating system is arranged internally and the operating system environment can only be modified and used by an attributive user; when the user uses the operating system on different computer devices, the operating system environment is the same, which can benefit the user experience; and the operating system is separated from the computer hardware, so that the upgrading of the hardware have no influence on the use of the operating system; and the built-in software of the wireless access device can be customized according to personal requirements, so that the individualization is relatively high;

Furthermore, the user does not need to maintain the system as the built-in system management software can upgrade and maintain the operating system automatically; the authentication is performed by the device security module and only when the preset password in the accessed wireless access device and the serial number of the wireless access device are consistent with the authentication information input by the user, the operating system or cloud can be logged in, so that the system security is enhanced; in addition, the wireless access device is small in volume and easy for carry.

DETAILED DESCRIPTION

Figure 1:
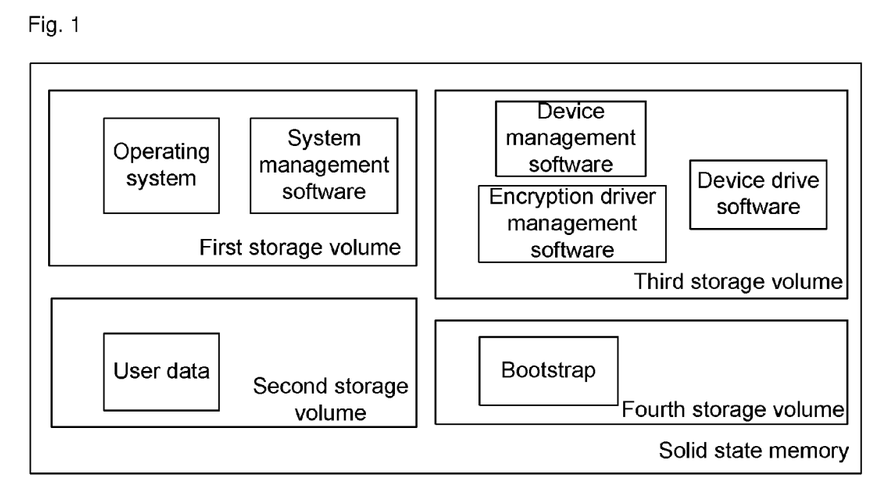
FIG. 1 is schematic diagram showing an internal partition of a solid state storage according to the disclosure.

The basic idea of the disclosure is that: an enumeration management module enumerates a fourth storage volume storing a bootstrap as a driver after a wireless access device is powered on; the computer device connected with the wireless access device reads the bootstrap, loads and runs the bootstrap; when it is determined that a command which indicates to switch to a host mode transmitted by the bootstrap which is run on the computer device is received, the enumeration management module enumerates the first storage volume, the third storage volume, the second storage volume and the wireless module as drivers according to the information of the first storage volume, the third storage volume and the second storage volume in the driver management module and cancels the enumeration of the fourth storage volume and then the computer device reads and loads the contents in the drivers; if the command which indicates to switch to the host mode is not received, then the wireless access device is switched to the peripheral device mode and the third storage volume, the second storage volume and the wireless module are enumerated as drivers according to the information of the third storage volume and the second storage volume in the driver management module, and then the computer device reads and loads the contents in the driver;

the computer device does not have a wireless access function; the storage volume is a partitioning of a solid state memory; and as shown in the FIG. 1, the fourth storage volume stores the bootstrap, the first storage volume stores an operating system and a system management software, the third storage volume stores an encryption driver management software, a device drive software and a device management software, and the second storage volume stores user data, wherein the first storage volume can be partitioned into several storage volumes again according to the situation; the second storage volume can be existent or nonexistent; if the second storage volume is existent, the second storage volume may include several storage volumes, namely, the second storage volume can store multiple user data. The bootstrap is loaded and executed to transmit the command which indicates to switch to the host mode to the enumeration management module after being read by the computer device; the encryption driver management software is loaded and then is configured to initiate the continuous enumeration of the enumeration management module in the peripheral device mode after being read by the computer device; the device drive software including drive program and the like of the wireless module is a drive program of the access device; the device management software is loaded after being read by the computer device and is configured to set storage volume information in the driver management module and initiate the continuous enumeration of the enumeration management module in the peripheral device mode; the storage volume information includes the attribute of each storage volume such as read-only and readable-writable, state of each storage volume such as participating in the enumeration or not participating in the enumeration and the like; participating in the enumeration means that the enumeration management module enumerates the storage volume; not participating in the enumeration means that the enumeration management module does not enumerate the storage volume; one storage volume except the third storage volume and the fourth storage volume can be set as not participating in the enumeration by means of the device management software; the user data relate to any data required to be stored by the user; the system management software is loaded after being read by the computer device, and the system management software can be either integrated to the operating system or existent independently which is decided by the operating system per se, and is used for searching and installing software upgrading information in the network or cloud; the searching includes: reading the name and version of the locally installed software, searching software in the network or cloud of which the name is consistent with that of the locally installed software; if the version of the searched software is higher than the locally installed software, then the software in the network or cloud is installed, otherwise the original version is still kept.

Figure 2:
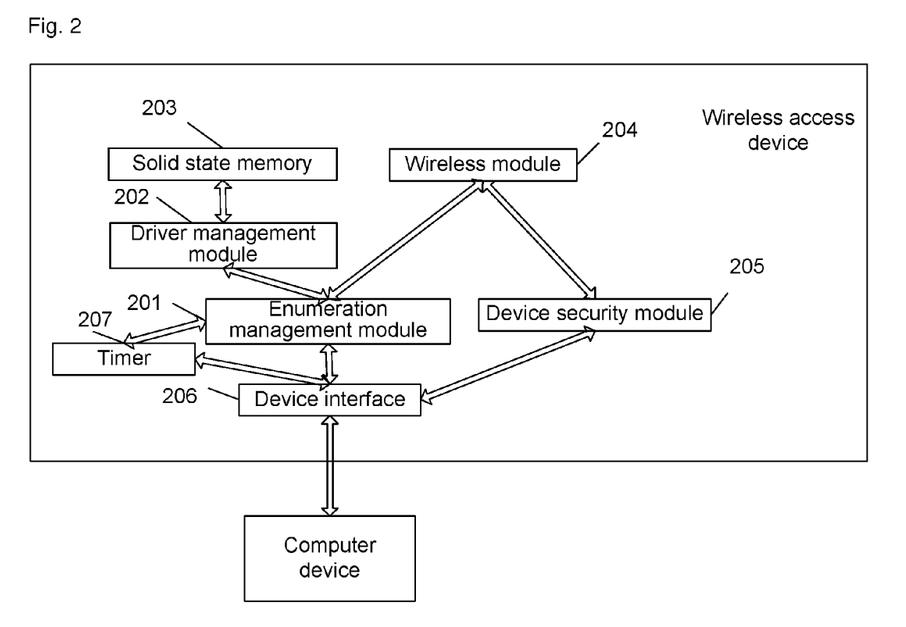
FIG. 2 a structural diagram showing a wireless access device according to the disclosure.

The disclosure is illustrated in detail with reference to specific embodiments and accompanying drawings; as shown in the FIG. 2, a wireless access device is configured to connect with a computer device which does not have a wireless access function; and the wireless access device includes: an enumeration management module 201, a driver management module 202, a solid state memory 203 and a wireless module 204;

the solid state memory 203 is partitioned into different storage volumes wherein a fourth storage volume stores a bootstrap, a first storage volume stores an operating system and a system management software, a third storage volume stores an encryption driver management software, a device drive software and a device management software, and a second storage volume stores user date; the first storage volume and the second storage volume are partitioned into several storage volumes again based on the situation; the solid state memory stores data by using a switching state of a transistor inside a storage chip and has the advantages of small volume, low power consumption and strong earthquake resistance;

the driver management module 202 is configured to store information of the storage volume; and the information of the storage volume can be preset in the driver management module 202, which can be realized through the configuration of the device management software;

the enumeration management module 201 is configured to: enumerate the fourth storage volume in the solid state memory 203 as a read-only driver after the wireless access device is powered on, switch to the host mode according to the information of the storage volume in the driver management module 202 when it is determined that a command which indicates to switch to the host mode transmitted by the bootstrap which is running on the computer device is received, enumerate the first storage volume, the third storage volume, the second storage volume and the wireless module 204 as drivers, and cancel the enumeration for the fourth storage volume; the enumeration management module 201 is further configured to: not enumerate the second storage volume when the information of the second storage volume indicates to not participate in the enumeration, wherein the wireless access device does not provide a storage space; the enumeration management module 201 is further configured to: switch to the peripheral device mode when the command which indicates to switch to the host mode is not received, and enumerate the third storage volume, the second storage volume and the wireless module 204 as drivers according to the information of the storage volume in the driver management module 202, wherein the information of the first storage volume indicates to not participate in the enumeration, and no enumeration is performed on the first storage volume; and furthermore, if the information of the second storage volume indicates to not participate in the enumeration, then no enumeration is performed on the second storage volume and the wireless access device does not provide a storage space; the enumeration is a process which enables the storage volume in the solid state memory 203 to be identified by the computer device; the enumeration of the fourth storage volume can be performed by means of the information of the fourth storage volume preset by the module per se or by reading the information of the fourth storage volume in the driver management module 202; the host mode means that the wireless access device accesses to the computer device and then the computer device is initiated; and the peripheral device mode means that the wireless access device accesses to the computer device which has been initiated;

the wireless module 204 is configured to establish a wireless connection with the network, including Wireless Fidelity (WIFI), cellular data connection and the like;

the computer device reads and loads the bootstrap in a driver corresponding to the fourth storage volume, the bootstrap transmits the command which indicates to switch to the host mode to the enumeration management module 201; the computer device resets through the bootstrap, wherein the reset includes: the bootstrap transmits a reset command to the computer device and the computer device resets according to the reset command; after the reset, the computer device reads and loads contents in the identified driver, which includes: the operating system and system management software in a driver corresponding to the first storage volume is loaded, and the encryption driver management software, device drive software and device management software in a driver corresponding to the third storage volume are read and loaded; a driver corresponding to the second storage volume is read and the wireless module 204 is available by means of the drive software of the wireless module 204 in the loaded device drive software, or the bootstrap is read but can not be loaded when the operating system per se is in operating the encryption driver management software, the device drive software and the device management software in the driver corresponding to the third storage volume are read and load; and the driver corresponding to the second storage volume is read, and the wireless module 204 can be available by means of the drive software of the wireless module 204 in the loaded device drive software as the wireless module 204 per se does not have the drive software.

The wireless access device further includes:

a timer 207 which is configured to be initiated when the wireless access device is powered on, wherein a timing time can be set according to experience;

the enumeration management module 201 is further configured to: read the time of the timer 207 and enter into the host mode to transmit the command indicating to switch to the host mode to the driver management module 202 when determining that the command indicating to switch to the host mode is received within the timing time; receive the storage volume information of the host mode transmitted by the driver management module 202, wherein the storage volume information of the host mode includes: the information of the first storage volume, the third storage volume and the second storage volume; and enumerate the first storage volume, the third storage volume and the second storage volume as drivers, meanwhile enumerate the wireless module 204 as a driver and cancel the enumeration for the fourth storage volume according to the attributes and states of the storage volumes in the storage volume information of the host mode;

the driver management module 202 is configured to: receive the command indicating to switch to the host mode from the enumeration management module 201 and transmit the storage volume information of the host mode to the enumeration management module.

The enumeration management module 201 is further configured to: enter into the peripheral device mode and transmit the command indicating to switch to the peripheral device mode to the driver management module 202 when the command indicating to switch to the host mode is not received within the timing time, and enumerate the third storage volume as the driver according to the received third storage volume information which includes the attribute and state of the third storage volume; transmit the received command which indicates to enumerate continuously and is transmitted by the encryption driver management software or the device management software to the driver management module 202, and enumerate the second storage volume as a driver according to the received information of the second storage volume and enumerate the wireless module 204 as a driver; and the driver management module 202 is further configured to: receive the command which indicates to switch to the peripheral device mode and is transmitted by the enumeration management module 201 and transmit the information of the third storage volume to the enumeration management module 201; receive the command which indicates to enumerate continuously and is transmitted by the enumeration management module 201 and transmit the information of the second storage volume to the enumeration management module 201.

The wireless access device further includes:

an device security module 205 which is configured to receive user inputted enumeration authentication information which is transmitted by the encryption driver management software or the device management software; after the successful authentication, return information of successful authentication to the encryption driver management software or the device management software, wherein the encryption drive management software or the device management software transmit the command indicating to enumerate continuously to the enumeration management module 201; the enumeration authentication information can be a password and a serial number of the wireless access device or in other forms, wherein the serial number of the wireless access device is an unique identifier of the wireless access device and is preset in the device security module 205, and the authentication is a process of confirming the legality of the authentication information which can be implemented by any authentication way in the related art, for example presetting a password or reading the user inputted authentication information can be adopted, if the preset password is determined to be consistent with the serial number of the wireless access device, then the input authentication information, the authentication is successful, otherwise, the authentication is failed.

The device security module 205 is further configured to receive user inputted login authentication information which is transmitted by the operating system which is run on the computer device when the user performs the operations such as accessing to the network and logging in the cloud through the operating system; after the successful authentication, allow the user to perform the operations such as accessing to the network and logging in the cloud, wherein the login authentication information can be the password and the serial number of the wireless access device or in other forms;

the wireless access device further includes:

a device interface 206 which can be the Universal Serial Bus (USB) interface or other interfaces in related art, is configured to provide a connection between the wireless access device and the computer device, wherein when the wireless access device is powered on, the level of the interface is high;

the enumeration management module 201 is further configured to read the level of the device interface 206; and if the level is high, then the device is powered on; and a time 207 is configured to read the level of the device interface 206; and if the level is high, then the device is powered on and the timer is initiated for timing.

Figure 3:
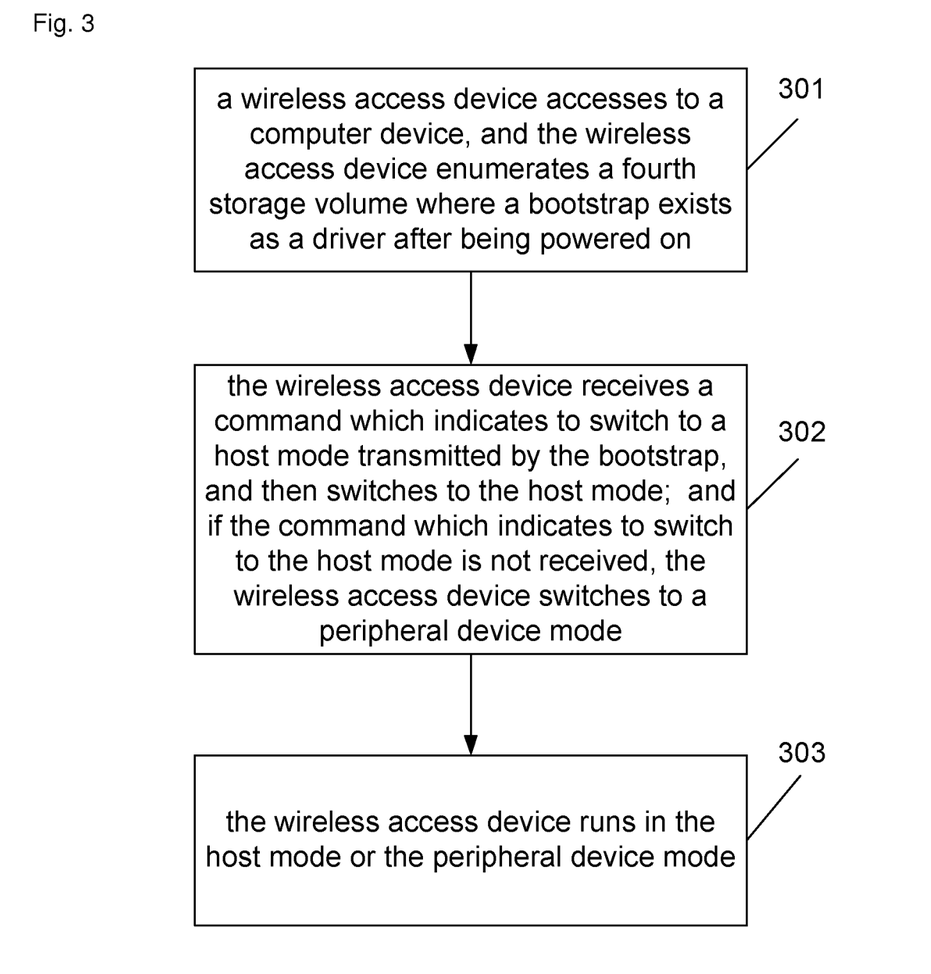
FIG. 3 is a flowchart showing a wireless access method according to the disclosure.

Based on the wireless access device, the disclosure also provides a wireless access method, as shown in the FIG. 3, which includes the steps below.

Step 301, the fourth storage volume where the bootstrap exists is enumerated as a driver after a wireless access device accesses to a computer device and the wireless access device is powered on; the wireless access device is a device which belongs to a build-in operating system and wireless module; the bootstrap is configured to run and transmit the command indicating to switch to the host mode to the enumeration management module after being read by the computer device;

the wireless access device accesses to the computer device, wherein the accessing process includes: the wireless access device is connected with the computer device which is not started up; or the wireless access device is connected with the computer device which is started up; when the computer device connected with the wireless access device is started up or the wireless access device is connected with the computer device which is started up and when the level of the device interface for the connection of the wireless access and the computer device is high, the wireless access device is powered on and the wireless access device enumerates the fourth storage volume as a driver, wherein the enumeration enables the storage volume of the wireless access device to be identified by the computer device.

Step 302, after receiving the command which indicates to switch to a host mode and is transmitted by the bootstrap, the wireless access device switches to the host mode, wherein if the command indicating to switch to the host mode is not received, then the wireless access device switches to a peripheral device mode;

after the wireless access device is powered on, a built-in timer is initiated; a timing time of the timer can be set according to experience; if the computer device is connected with the wireless access device after the computer is started up, the bootstrap cannot be read an uploaded as the computer device has run the operating system per se, as a result of which, the wireless access device cannot receive the command which indicates to switch to the host mode and is transmitted by the bootstrap within the timing time, the wireless access device enters into the peripheral mode and enumerates the third storage volume as a driver according to the self-stored storage volume information, wherein the information of the first storage volume indicates to not participate in the enumeration, and then the wireless access device does not enumerate the first storage volume, the computer device reads and loads the encryption driver management software, the device management software and the device drive software in the third storage volume, and the encryption driver management software or the device management software transmits the command indicating to enumerate continuously to the wireless access device; or when the wireless access device is internally provided with the device security module, the user is required to input the enumeration authentication information after the encryption driver management software or the device management software in the third storage volume is loaded, and the encryption driver management software or the device management software transmits the enumeration authentication information to a device security module of the wireless access device; the device security module authenticates the enumeration authentication information; after successful authentication, the information of the successful authentication is transmitted to the encryption driver management software or the device management software, and the encryption driver management software or the device management software transmits the command indicating to enumerate continuously to the wireless access device; the device security module is configured to authenticate the enumeration authentication information and enhance system security; the enumeration authentication information can be a password and a serial number of the wireless access device or in other forms; the serial number of the wireless access device is an unique identifier of the wireless access device and is preset in the device security module per se; the authentication is a process of confirming the legality of the authentication information, and any authentication way in the related art, for example presetting a password or reading the user inputted authentication information can be adopted, if the preset password the serial number of the wireless access device is determined to be consistent with the inputted authentication information, then the authentication is successful, otherwise, the authentication is failed.

The wireless access device receives the command indicating to enumerate continuously and enumerates the wireless module as a driver; furthermore, if the wireless access device includes the second storage volume and the information of the second storage volume indicates to participate in the enumeration, then the wireless access device enumerates the second storage volume as a driver; and as the wireless module per se does not have a drive software, the computer device reads and loads the wireless module drive software in the device drive software, so as to make the wireless module available. When the wireless module is available, the WIFI, cellular data connection or other ways can be adopted to establish a connection with the network.

If the computer device is connected with the wireless access device and then is started up, then the computer device can read and load the bootstrap in the driver, as a result of which the wireless access device can receive the command which indicates to switch to the host mode and is transmitted by the bootstrap run on the computer device within the timing time; the wireless access device enters into the host mode and enumerates the first storage volume and the third storage volume as drivers and enumerates the wireless module as a driver according to the self-stored storage volume information; if the wireless access device includes the second storage volume and the information of the second storage volume indicates to participate in the enumeration, the wireless access device enumerates the second storage volume as a driver; in the bootstrap running state, the computer device cannot load the operating system in the driver corresponding to the first storage volume, therefore, in order to prevent the reset computer device from continuously reading and loading the bootstrap in the driver corresponding to the fourth storage volume and entering into a dead circulation, the enumeration for the fourth storage volume needs to be canceled.

After the bootstrap running on the computer device transmits the command indicating to switch to the host mode to the wireless access device, the computer device is reset, wherein the reset computer device is avoided from power failure; the reset computer device reads and loads the operating system, encryption driver management software and device management software in the driver of identified the wireless access device, reads and loads the wireless module drive software in the device drive software to make the wireless module available.

Step 303, the wireless access device runs in the host mode or the peripheral device mode.

When the wireless access device runs in the peripheral device mode, the wireless access device can be used as a USB disk; the computer device can establish a connection with the network through the wireless module of the wireless access device and can log in the cloud; when the wireless access device is internally provided with the device security module and when the user performs the operations such as accessing to the network and logging in the cloud through the operating system and the wireless module of the wireless access device, the wireless module needs to input the login authentication information, and the wireless access devices performs authentication and, after the successful authentication, allows the user to access to the network and log in the cloud through the operating system and the wireless module; and the login authentication information includes a password and a serial number of the wireless access device or in other forms.

When the wireless access device works in the host mode, the operating module in the wireless access device runs on the connected computer device and the network can be connected through the wireless module of the wireless access device; meanwhile, when the wireless access device is internally provided with the device security module and when the user performs the operations such as logging in the operating system, and accessing to the network and logging in the cloud through the operating system, the operating system needs to input the authentication information, and the wireless access device performs authentication and, after the successful authentication, allows the user to log in the operating system, access to the network and log in the cloud through the operating system.

In addition, the operating system and the stored software of the wireless access device can be customized according to the demands of users, so as to be further satisfied with personal requirements. The system management software of the wireless access device can be loaded after being read by the computer device, and can be used for searching and then installing the software upgrading information in the network or cloud, without maintaining the software by the user.

All those described above are only the preferred embodiments of the disclosure and do not mean to limit the scope of the disclosure. Any modifications, equivalent replacements, improvements and the like within the spirit and principle of the disclosure will fall in the scope of the disclosure.

What is claimed is:

1. A wireless access device, comprising a wireless module which establishes a wireless connection with a network and a solid state memory which is partitioned into different storage volumes, wherein in the solid state storage, a fourth storage volume stores a bootstrap, a first storage volume stores an operating system and a system management software, and a third storage volume stores an encryption driver management software, a device drive software and a device management software,
    wherein the wireless access device further comprises an enumeration management module and a driver management module;
    the driver management module is configured to store information of the storage volumes;
    the enumeration management module is configured to: enumerate the fourth storage volume storing the bootstrap as a driver after the wireless access device is powered on; switch to a host mode according to the information of the storage volumes in the driver management module when it is determined that a command which indicates to switch to the host mode transmitted by the bootstrap running on a computer device is received, and enumerate the first storage volume, the third storage volume and the wireless module as drivers; switch to a peripheral device mode according to the information of the storage volumes in the driver management module when it is determined that the command which indicates to switch to the host mode is not received, and enumerate the third storage volume and the wireless module as drivers; and
    wherein in the host mode, the wireless access device acts as an bootable disk for the computer device.

2. The wireless access device according to claim 1, further comprising:
    a timer configured to initiate when the wireless access device is powered on, wherein
    the enumeration management module is configured to: read a timing time of the timer, and transmits the command which indicates to switch to the host mode to the driver management module when the command which indicates to switch to the host mode is not received within the timing time of the timer; receive host mode storage volume information transmitted by the driver management module, enumerate the first storage volume and the third storage volume as drivers, and meanwhile enumerate the wireless module as a driver, and cancel the enumeration for the fourth storage volume; and meanwhile the bootstrap resets the computer device; and
    the driver management module is configured to receive the command which indicates to switch to the host mode from the enumeration management module, and transmit the host mode storage volume information to the enumeration management module.

3. The wireless access device according to claim 2, wherein the enumeration management module is configured to: transmit a command which indicates to switch to the peripheral device module to the driver management module when it is determined that the command which indicates to switch to the host mode is not received within the timing time, receive information of the third storage volume, and enumerates the third storage volume as a driver according to the information of the third storage volume; receives a command which indicates to enumerate continuously from the encryption driver management software or the device management software running on the computer device, and enumerates the wireless module as a driver; and the driver management module is configured to receive the command which indicates to switch to the peripheral device mode transmitted from the enumeration management module, and returns the information of the third storage volume to the enumeration management module.

4. The wireless access device according to claim 1, wherein the solid state memory further comprises a second storage volume for storing user data;

the enumeration management module is configured to enumerate the second storage volume as a driver when the wireless access device is in the host mode and information of the second storage volume indicates to participate in the enumeration and when the first storage volume, the third storage volume and the wireless module are enumerated as drivers; and the enumeration management module transmits the received command which indicates to enumerate continuously to the driver management module after enumerating the third storage volume as a driver in the peripheral device mode, enumerates the second storage volume as a driver according to the returned information of the second storage volume which indicates to participate in the enumeration, and meanwhile enumerates the wireless module as a driver; and the driver management module is configured to receive the command which indicates to enumerate continuously and transmits the information of the second storage volume to the enumeration management module.

5. The wireless access device according to claim 4, further comprising:

a device security module configured to receive user inputted authentication information transmitted by the encryption driver management software or the device management software, and transmit information of successful authentication to the encryption management software or the device management software after the successful authentication, and the encryption driver management software or the device management software transmits the command which indicates to enumerate continuously to the enumeration management module.

6. The wireless access device according to claim 5, wherein the device security module is further configured to receive the authentication information transmitted by the operating system, confirming the successful authentication and allowing the user to log in the operating system, log in a cloud and access to the network through the operating system when logging in the operating system, logging in the cloud and accessing to the network through the operating system in the host mode; and the device security module is further configured to log in the cloud and access to the network through the operating system and the wireless module, receive the authentication information transmitted by the wireless module, confirm the successful authentication and allow the user to log in the cloud and access to the network in the peripheral device mode.

7. The wireless access device according to claim 1, further comprising:

a device interface configured to provide a channel to connect with the computer device, wherein the channel comprises a plurality of wires, and a wire of the plurality wires is configured to provide power from the computer device to the wireless access device, and wherein a level of a the wire of the plurality of wires of the channel is high when the device interface is powered on; and the enumeration management module is connected with the device interface.

8. A wireless access method, comprising:

powering on a wireless access device, enumerating a fourth storage volume storing a bootstrap as a driver, switching to a host mode when it is determined that a command which indicates to switch to a host mode transmitted by the bootstrap is received, and enumerating a first storage volume, a third storage volume and a wireless module as drivers; uploading an operating system in the wireless access device, and accessing to a network through the wireless module;

switching to a peripheral device mode when it is determined that the command which indicates to switch to the host mode transmitted by the bootstrap is not received, enumerating the third storage volume and the wireless module as drivers, and accessing to the network through the wireless module; and wherein in the host mode, the wireless access device acts as an bootable disk for a computer device.

9. The wireless access method according to claim 8, wherein switching to the host mode comprises:

initiating a timer after the wireless access device is powered on, switching to the host mode when the command which indicates to switch to the host mode transmitted by the bootstrap running on the computer device is received within a timing time; enumerating the first storage volume, the third storage volume and the wireless module as drivers according to self-stored information of the first storage volume and the third storage volume, and meanwhile cancelling the enumeration for the storage volume where the bootstrap exists.

10. The wireless access method according to claim 8, wherein switching to the peripheral device mode comprises:

initiating a timer after the wireless access device is powered on, switching to the peripheral device mode when the command which indicates to switch to the host mode is not received within a timing time, and enumerating the third storage volume as a driver according to the self-stored information of the third storage volume;

transmitting, by the computer device, a command which indicates to enumerate continuously to the wireless access device by running an encryption driver management software or a device management software; or transmitting, by the computer device, the command which indicates to enumerate continuously to the wireless access device by running the encryption driver management software or the device management software and inputting authentication information which is successfully authenticated by a device security module, and enumerating, by the wireless access device, the wireless module as a driver.

11. The wireless access method according to claim 8, wherein the wireless access device comprises a second storage volume for storing user data, the method further comprises:

switching to the host mode, enumerating the second storage volume as a driver when the wireless access device enumerates the first storage volume, the third storage volume and the wireless module as drivers and when information of the second storage volume indicates to participate in the enumeration; and switching to the peripheral device mode, enumerating, by the wireless access device, the third storage volume as a driver, and transmitting, by the computer device, a command which indicates to enumerate continuously to the wireless access device; and enumerating, by the wireless access device, the second storage volume as a driver according to self-stored information of the second storage volume which indicates to participate in the enumeration, and meanwhile enumerating the wireless module as a driver.

12. The wireless access method according to claim 11, wherein powering on the wireless access device comprises:

reading, by the wireless access device, an interface level of a device interface connected to the computer device, and the wireless access device is powered on when the interface level is high.

13. The wireless access device according to claim 2, wherein the solid state memory further comprises a second storage volume for storing user data;

the enumeration management module is configured to enumerate the second storage volume as a driver when the wireless access device is in the host mode and information of the second storage volume indicates to participate in the enumeration and when the first storage volume, the third storage volume and the wireless module are enumerated as drivers; and the enumeration management module transmits the received command which indicates to enumerate continuously to the driver management module after enumerating the third storage volume as a driver in the peripheral device mode, enumerates the second storage volume as a driver according to the returned information of the second storage volume which indicates to participate in the enumeration, and meanwhile enumerates the wireless module as a driver; and the driver management module is configured to receive the command which indicates to enumerate continuously and transmits the information of the second storage volume to the enumeration management module.

14. The wireless access device according to claim 3, wherein the solid state memory further comprises a second storage volume for storing user data;

the enumeration management module is configured to enumerate the second storage volume as a driver when the wireless access device is in the host mode and information of the second storage volume indicates to participate in the enumeration and when the first storage volume, the third storage volume and the wireless module are enumerated as drivers; and the enumeration management module transmits the received command which indicates to enumerate continuously to the driver management module after enumerating the third storage volume as a driver in the peripheral device mode, enumerates the second storage volume as a driver according to the returned information of the second storage volume which indicates to participate in the enumeration, and meanwhile enumerates the wireless module as a driver; and the driver management module is configured to receive the command which indicates to enumerate continuously and transmits the information of the second storage volume to the enumeration management module.

15. The wireless access device according to claim 13, further comprising:

a device security module configured to receive user inputted authentication information transmitted by the encryption driver management software or the device management software, and transmit information of successful authentication to the encryption management software or the device management software after the successful authentication, and the encryption driver management software or the device management software transmits the command which indicates to enumerate continuously to the enumeration management module.

16. The wireless access device according to claim 14, further comprising:

a device security module configured to receive user inputted authentication information transmitted by the encryption driver management software or the device management software, and transmit information of successful authentication to the encryption management software or the device management software after the successful authentication, and the encryption driver management software or the device management software transmits the command which indicates to enumerate continuously to the enumeration management module.

17. The wireless access device according to claim 15, wherein the device security module is further configured to receive the authentication information transmitted by the operating system, confirming the successful authentication and allowing the user to log in the operating system, log in a cloud and access to the network through the operating system when logging in the operating system, logging in the cloud and accessing to the network through the operating system in the host mode; and the device security module is further configured to log in the cloud and access to the network through the operating system and the wireless module, receive the authentication information transmitted by the wireless module, confirm the successful authentication and allow the user to log in the cloud and access to the network in the peripheral device mode.

18. The wireless access device according to claim 16, wherein the device security module is further configured to receive the authentication information transmitted by the operating system, confirming the successful authentication and allowing the user to log in the operating system, log in a cloud and access to the network through the operating system when logging in the operating system, logging in the cloud and accessing to the network through the operating system in the host mode; and the device security module is further configured to log in the cloud and access to the network through the operating system and the wireless module, receive the authentication information transmitted by the wireless module, confirm the successful authentication and allow the user to log in the cloud and access to the network in the peripheral device mode.

19. The wireless access device according to claim 2, further comprising:

a device interface configured to provide a channel to connect with the computer device, wherein the channel comprises a plurality of wires, and a wire of the plurality wires is configured to provide power from the computer device to the wireless access device, and wherein a level of the wire of the plurality of wires the channel is high when the device interface is powered on; and the enumeration management module is connected with the device interface.

20. The wireless access device according to claim 3, further comprising:

a device interface configured to provide a channel to connect with the computer device, wherein the channel comprises a plurality of wires, and a wire of the plurality wires is configured to provide power from the computer device to the wireless access device, and wherein a level of the wire of the plurality of wires of the channel is high when the device interface is powered on; and the enumeration management module is connected with the device interface.

21. The wireless access method according to claim 9, wherein the wireless access device comprises a second storage volume for storing user data, the method further comprises:

switching to the host mode, enumerating the second storage volume as a driver when the wireless access device enumerates the first storage volume, the third storage volume and the wireless module as drivers and when information of the second storage volume indicates to participate in the enumeration; and switching to the peripheral device mode, enumerating, by the wireless access device, the third storage volume as a driver, and transmitting, by the computer device, a command which indicates to enumerate continuously to the wireless access device; and enumerating, by the wireless access device, the second storage volume as a driver according to self-stored information of the second storage volume which indicates to participate in the enumeration, and meanwhile enumerating the wireless module as a driver.

22. The wireless access method according to claim 10, wherein the wireless access device comprises a second storage volume for storing user data, the method further comprises:

switching to the host mode, enumerating the second storage volume as a driver when the wireless access device enumerates the first storage volume, the third storage volume and the wireless module as drivers and when information of the second storage volume indicates to participate in the enumeration; and switching to the peripheral device mode, enumerating, by the wireless access device, the third storage volume as a driver, and transmitting, by the computer device, a command which indicates to enumerate continuously to the wireless access device; and enumerating, by the wireless access device, the second storage volume as a driver according to self-stored information of the second storage volume which indicates to participate in the enumeration, and meanwhile enumerating the wireless module as a driver.

23. The wireless access method according to claim 21, wherein powering on the wireless access device comprises:

reading, by the wireless access device, an interface level of a device interface connected to the computer device, and the wireless access device is powered on when the interface level is high.

24. The wireless access method according to claim 22, wherein powering on the wireless access device comprises:

reading, by the wireless access device, an interface level of a device interface connected to the computer device, and the wireless access device is powered on when the interface level is high.

* * * * *